US010832841B2

(12) United States Patent
Takahashi

(10) Patent No.: US 10,832,841 B2
(45) Date of Patent: Nov. 10, 2020

(54) ELECTROMAGNETIC STEEL SHEET

(71) Applicant: TOYOTA JIDOSHA KABUSHIKI KAISHA, Toyota (JP)

(72) Inventor: Toshimitsu Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/383,980

(22) Filed: Apr. 15, 2019

(65) Prior Publication Data

US 2019/0333664 A1 Oct. 31, 2019

(30) Foreign Application Priority Data

Apr. 27, 2018 (JP) ................................ 2018-086628

(51) Int. Cl.

| | |
|---|---|
| ***B32B 3/00*** | (2006.01) |
| ***H01F 1/18*** | (2006.01) |
| ***C23C 26/00*** | (2006.01) |
| ***C23C 24/00*** | (2006.01) |
| ***H01F 41/02*** | (2006.01) |
| *H01F 3/02* | (2006.01) |

(52) U.S. Cl.

CPC ............... *H01F 1/18* (2013.01); *C23C 24/00* (2013.01); *C23C 26/00* (2013.01); *H01F 41/0233* (2013.01); *H01F 3/02* (2013.01); *Y10T 428/24926* (2015.01)

(58) Field of Classification Search

None

See application file for complete search history.

(56) References Cited

U.S. PATENT DOCUMENTS

| | | | | |
|---|---|---|---|---|
| 3,565,685 A * | 2/1971 | Suzuki | H01B 3/006 | 428/384 |
| 3,770,482 A * | 11/1973 | Millar | B05D 1/06 | 427/470 |
| 3,839,256 A * | 10/1974 | Parkinson | C08K 3/34 | 524/188 |
| 4,904,527 A * | 2/1990 | Nolle | C21D 8/1283 | 427/208 |
| 5,955,201 A * | 9/1999 | Loudermilk | C23C 22/74 | 428/450 |
| 6,270,904 B1 * | 8/2001 | Tose | C03C 8/02 | 428/432 |

FOREIGN PATENT DOCUMENTS

| | | | |
|---|---|---|---|
| JP | 2004068031 A * | 3/2004 | C22C 38/00 |
| JP | 2012-046825 A | 3/2012 | |

(Continued)

*Primary Examiner* — Seth Dumbris

(74) *Attorney, Agent, or Firm* — Sughrue Mion, PLLC

(57) ABSTRACT

An electromagnetic steel sheet that can maintain satisfactory processability and thermostability, and exhibit a high space factor when used as, for example, a motor or transformer core material is provided. Such electromagnetic steel sheet comprises a coat containing an organic material provided on one outermost surface thereof, and a coat containing low-melting glass provided at least partially on the other outermost surface thereof. A motor core comprising such electromagnetic steel sheet is also provided. A method for producing such electromagnetic steel sheet and a method for producing such motor core are also provided.

16 Claims, 5 Drawing Sheets

(56) References Cited

FOREIGN PATENT DOCUMENTS

| | | | | |
|---|---|---|---|---|
| JP | 2015-168839 | A | 9/2015 | |
| JP | 2016-029205 | A | 3/2016 | |
| JP | 2016029205 | A * | 3/2016 | ............. B32B 15/04 |
| JP | 2016-176137 | A | 10/2016 | |
| JP | 2016-176138 | A | 10/2016 | |
| WO | 2006/043612 | A1 | 4/2006 | |

* cited by examiner

ELECTROMAGNETIC STEEL SHEET

CROSS REFERENCE TO RELATED APPLICATIONS

The present application claims priority from Japanese patent application JP 2018-086628 filed on Apr. 27, 2018, the content of which is hereby incorporated by reference into this application.

BACKGROUND

Technical Field

The present disclosure concerns an electromagnetic steel sheet that can be used as, for example, a motor or transformer core material.

Background Art

An electromagnetic steel sheet is used as, for example, a motor or transformer core material. An electromagnetic steel sheet for such application generally comprises an insulating coat provided on its surface. When producing a motor or transformer core, for example, an electromagnetic steel sheet comprising an insulating coat provided on its surface is punched out and formed into a given shape, and a given number of sheets are stacked on top of each other. Thereafter, the stacked electromagnetic steel sheets are joined to each other via welding or other means to form a core.

In recent years, thickness of an electromagnetic steel sheet of a core material is reduced so as to improve efficiency. When producing a core with the use of a thin electromagnetic steel sheet, a coat containing an joining material (hereafter, it is also referred to as an "joining coat") may be provided on the surface of an electromagnetic steel sheet to join the stacked electromagnetic steel sheets to each other instead of joining the stacked electromagnetic steel sheets to each other via welding or other means.

The formed core may suffer from deteriorated magnetic properties resulting from, for example, strain caused by punching or other processing. Accordingly, the formed core may occasionally be subjected to annealing with pressurization at high temperature (e.g., 700° C. to 800° C.).

For example, JP 2015-168839 A discloses an electromagnetic steel sheet comprising an insulating coat containing a water glass-derived substance and oxide particles on at least one surface thereof, wherein the water glass-derived substance comprises either or both Na and K, and Si, and the oxide particles comprises either or both Na and K, and Si and B, and the insulating coat has a given ratio. JP 2015-168839 A describes that joining property is enhanced by comprising particular components of the water-grass-derived substances and the oxide particles at a given ratio, joining property is thus maintained upon annealing such as stress-relief annealing, and joining properties are exerted at the time of annealing.

JP 2016-29205 A discloses an electromagnetic steel sheet comprising an insulating coat containing an inorganic coat and an organic resin layer on at least one surface thereof, wherein the electromagnetic steel sheet comprises an undercoat layer comprising an inorganic coat layer on the surface thereof and an organic resin layer on its outermost surface, an area of the organic resin layer coated is 50% to 80%, and the amount of the coat is 0.05 g/m$^2$ to 4.0 g/m$^2$ per surface.

JP 2016-176137 A discloses an electromagnetic steel sheet comprising an insulating coat, which comprises, on at least one surface, an insulating coat comprising particles of 1 or more substances selected from among AN, BN, $Al_2O_3$, and MgO in an amount of 20% to 80% by mass and a low-melting glass- and/or water glass-derived substance in an amount of 20% to 80% by mass.

JP 2016-176138 A discloses an electromagnetic steel sheet comprising an insulating coat provided on at least one surface thereof, wherein the insulating coat is composed of 20% to 99% by mass of low-melting glass and 1% to 15% by mass of polyvinyl alcohol-based resin.

JP 2012-46825 A discloses a thermostable, joining, and insulating coat, which comprises resin with a softening temperature of room temperature to 300° C. and a low-melting inorganic component with a softening temperature of 1,000° C. or lower, and an electromagnetic steel sheet comprising such thermostable, joining, and insulating coat provided on at least one surface thereof.

WO 2006/043612 discloses a thermostable, joining, and insulating coat comprising resin with a softening temperature of room temperature to 300° C. and a low-melting inorganic component with a softening temperature of 1,000° C. or lower.

SUMMARY

As described above, electromagnetic steel sheets each comprising a coat containing an organic material, and/or a coat containing a glass-based material such as a water glass-derived substance and low-melting glass have been known. However, such electromagnetic steel sheets comprising coats as described above have several drawbacks. For example, an organic material that is used for forming a joining coat generally has low heat resistance. Accordingly, an electromagnetic steel sheet comprising a coat containing such organic material cannot be subjected to stress-relief annealing, or joining property thereof may be deteriorated to a significant extent by performing annealing.

In comparison with a coat made of an organic material, in general, a joining coat comprising a glass-based material such as a water glass-derived substance and low-melting glass is very hard. Accordingly, an electromagnetic steel sheet comprising a joining coat containing a glass-based material is poor in processability at the time of, for example, punching. In addition, a joining coat comprising a glass-based material generally has larger coat thickness, compared with a coat made of an organic material. When producing a motor or transformer core by stacking electromagnetic steel sheets each comprising a joining coat containing a glass-based material on top of each other, accordingly, a space factor becomes low, disadvantageously.

Under the above circumstances, the present disclosure provides an electromagnetic steel sheet that can maintain satisfactory processability and thermostability, and exhibit a high space factor when used as, for example, a motor or transformer core material.

Various means for dissolving the problems as described above were examined. As a result, it was discovered that satisfactory thermostability that would enable annealing at high temperature, and high processability could be attained by providing a coat containing an organic material on an outermost surface of an electromagnetic steel sheet, and a coat containing low-melting glass at least partially on the other outermost surface thereof, designating the coat containing low-melting glass as a joining coat, and designating the surface comprising a coat containing an organic material as a surface to be subjected to processing such as punching. In addition, it was further discovered that a motor core that can be obtained by stacking the electromagnetic steel sheets with the features as described above on top of each other could exhibit a high space factor. The present disclosure has been completed on the basis of the finding described above.

Specifically, the present disclosure encompasses the aspects and the embodiments described below.

(1) An electromagnetic steel sheet comprising a coat containing an organic material provided on one outermost surface thereof, and a coat containing low-melting glass provided at least partially on the other outermost surface thereof.

(2) The electromagnetic steel sheet according to embodiment (1) above, wherein the coats containing low-melting glass are provided to form a lattice-like pattern.

(3) The electromagnetic steel sheet according to embodiment (2) above, wherein the coats containing low-melting glass are provided at intervals from each other.

(4) A motor core comprising the electromagnetic steel sheet according to any of embodiments (1) to (3) above.

(5) A method for producing the electromagnetic steel sheet according to any of embodiments (1) to (3) comprising:

a step of forming an organic coat comprising forming a coat containing an organic material on at least one surface of an electromagnetic steel sheet material; and a step of forming a low-melting glass coat comprising forming a coat containing low-melting glass at least partially on one outermost surface of the steel sheet material obtained in the step of forming an organic coat.

(6) A method for producing the motor core according to embodiment (4) comprising:

a step of punching comprising punching out the electromagnetic steel sheet according to any of embodiments (1) to (3); and a step of pressure annealing comprising stacking a plurality of the electromagnetic steel sheets obtained in the step of punching on top each other and subjecting the resultant to annealing with pressurization.

(7) The method according to embodiment (6), wherein the step of pressure annealing is performed under the conditions that satisfy formula (I):

$$Xa = \sqrt{\frac{X^2 \times t}{ta}} \leqq Y \cong L \times 0.5 \tag{I}$$

wherein

X represents a maximal diameter of the outermost surface of the coat containing low-melting glass before the step of pressure annealing;

t represents thickness of the coat containing low-melting glass before the step of pressure annealing;

Xa represents a maximal diameter of the outermost surface of the coat containing low-melting glass after the step of pressure annealing;

ta represents thickness of the coat containing low-melting glass after the step of pressure annealing;

Y represents a distance between centroids of the outermost surfaces of the coats containing low-melting glass adjacent thereto; and L represents a teeth width of a stator to which the motor core is applied.

The present disclosure can provide an electromagnetic steel sheet that can maintain satisfactory processability and thermostability, and exhibit a high space factor when used as, for example, a motor or transformer core material.

DETAILED DESCRIPTION

Hereafter, embodiments of the present disclosure are described in detail.

<1. Electromagnetic Steel Sheet>

An aspect of the present disclosure concerns an electromagnetic steel sheet comprising a coat containing an organic material on one outermost surface thereof, and a coat containing low-melting glass at least partially on the other outermost surface thereof.

Figure 1:
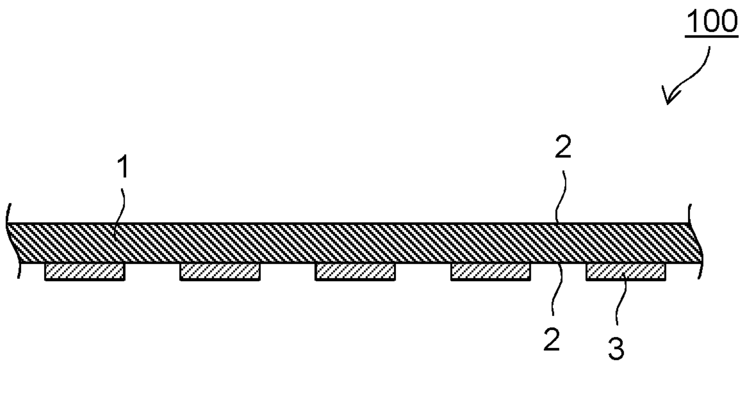
FIG. 1 shows a cross-sectional view that schematically shows a configuration of the electromagnetic steel sheet according to an aspect of the present disclosure.

FIG. 1 shows a configuration of one embodiment of an electromagnetic steel sheet according to the present aspect. As shown in FIG. 1, the electromagnetic steel sheet 100 according to the present aspect comprises a coat 2 containing an organic material on one outermost surface of the electromagnetic steel sheet material 1, and a coat 3 containing low-melting glass at least partially on the other outermost surface thereof. In general, the electromagnetic steel sheet according to the present aspect uses a coat containing low-melting glass as a joining coat, and a coat containing an organic material as an insulating coat. Also, the electromagnetic steel sheet according to the present aspect generally uses a surface provided with a coat containing low-melting glass as a joining surface when stacking electromagnetic steel sheets on top of each other, and a surface provided with a coat containing an organic material as a surface to be subjected to processing such as punching. Thus, an area in which a hard coat containing low-melting glass is brought into direct contact with a mold used for processing such as punching can be reduced. Because of the constitution as described above, the electromagnetic steel sheet according to the present aspect can exert high processability.

Concerning the electromagnetic steel sheet according to the present aspect, a coat containing low-melting glass may be provided on the outermost surface opposite from a surface comprising a coat containing an organic material on its outermost surface. Any coat can be provided between the coat containing low-melting glass and the electromagnetic steel sheet material. As shown in FIG. 1, for example, the electromagnetic steel sheet 100 according to the present aspect may comprise a coat 2 containing an organic material provided on each of the both surfaces of the electromagnetic steel sheet material 1, and a coat 3 containing low-melting glass at least partially on the surface of the coat 2 containing an organic material provided on one surface of the electromagnetic steel sheet material 1. Thus, the electromagnetic steel sheet according to the present aspect can effectively exert insulation properties and corrosion resistance because of the coat containing an organic material, and high processability.

Concerning the electromagnetic steel sheet according to the present aspect, an electromagnetic steel sheet material can be appropriately selected from among various materials that are generally used in the art, such as a soft iron sheet (an electrical iron sheet), a general cold-rolled steel sheet (e.g., SPCC), a directional electromagnetic steel sheet, and a non-directional electromagnetic steel sheet.

An organic material contained in the coat of the electromagnetic steel sheet according to the present aspect includes, but not particularly limited to, aqueous organic resins, such as acrylic resin, epoxy resin, alkyd resin, polyolefin resin, styrene resin, vinyl acetate resin, phenolic resin, polyester resin, urethane resin, and melamine resin. An organic material contained in the coat of the electromagnetic steel sheet according to the present aspect may be aqueous organic resins, such as acrylic resin, epoxy resin, or styrene resin. Concerning the electromagnetic steel sheet according to the present aspect, a coat containing an organic material can be formed by coating an electromagnetic steel sheet material with a coating liquid in the form of, for example, an emulsion, dispersion, or suspension containing the organic material exemplified above. The organic material has corrosion resistance as well as insulation properties. In addition, the organic material is soft and thus is capable of forming a thin coat. By incorporating an organic material with such properties into a coat, accordingly, the electromagnetic steel sheet according to the present aspect can exert high processability.

Concerning the electromagnetic steel sheet according to an aspect of the present aspect, a coat containing an organic material may further contain an inorganic material. According to the present embodiment, an inorganic material that is further incorporated into a coat containing an organic material may be an inorganic compound containing, for example, Al, Ca, Li, F, P, Zn, V, Te, Ge, Ag, Tl, S, I, Br, As, Bi, Cd, Pb, or Si. When a coat containing an organic material further contains an inorganic material, insulation properties and corrosion resistance of the coat can be further improved.

In general, a melting point or softening point of low-melting glass exceeds a temperature range in which a motor core is generally used, and it is below a temperature range in which pressure annealing is carried out for stress relief. When the motor core according to an aspect of the present disclosure is obtained by stacking the electromagnetic steel sheets according to the present aspect on top of each other, as described below, a coat containing low-melting glass is appropriately molten or softened by pressure annealing without loss, and the electromagnetic steel sheets according to the present aspect can be strongly joined to each other. When the resulting motor core according to an aspect of the present disclosure is used, the joining coat can be substantially suppressed from melting or softening. Thus, the electromagnetic steel sheet according to the present aspect can exert satisfactory thermostability.

Low-melting glass contained in the coat of the electromagnetic steel sheet according to the present aspect includes, but not particularly limited to, materials composed of $SiO_2$—$B_2O_3$—$R_2O$, $P_2O_5$—$R_2O$, $SiO_2$—PbO—$B_2O_3$, $B_2O_3$—$Bi_2O_3$, $SiO_2$—$B_2O_3$—ZnO, SnO—$P_2O_5$, and $SiO_2$—$B_2O_3$—$ZrO_2$, wherein R represents an alkali metal. Low-melting glass contained in the coat of the electromagnetic steel sheet according to the present aspect may be a material composed of, for example, $SiO_2$—$B_2O_3$—$R_2O$. A melting point of low-melting glass contained in the coat of the electromagnetic steel sheet according to the present aspect may be 500° C. to 600° C. In an embodiment, a particle diameter of low-melting glass contained in the coat of the electromagnetic steel sheet according to the present aspect may be 10 μm or less. In another embodiment, it may be 1 μm or less. By incorporating low-melting glass with such properties into a coat, the electromagnetic steel sheet according to the present aspect can exert satisfactory thermostability and high processability.

Concerning the electromagnetic steel sheet according to an aspect of the present aspect, a coat containing low-melting glass may further contain an organic material. According to the present embodiment, an organic material that is further incorporated into the coat containing low-melting glass can be appropriately selected from among materials used for a coat containing an organic material exemplified above. The coat containing low-melting glass that further contains an organic material can be provided with insulation properties and corrosion resistance.

A coat containing low-melting glass is provided at least partially on one outermost surface of the electromagnetic steel sheet according to the present aspect. On one embodiment of the electromagnetic steel sheet according to an aspect of the present aspect, coats each containing low-melting glass may be provided to form a lattice-like pattern. On another embodiment of the electromagnetic steel sheet according to an aspect of the present aspect, coats each containing low-melting glass may be provided to form a lattice-like pattern at intervals from each other (FIG. 2 (A) and FIG. 3 (A)). Thus, an area in which a hard coat containing low-melting glass is brought into direct contact with a mold used for processing such as punching can be reduced. Because of the constitution as described above, the electromagnetic steel sheet according to the present aspect can exert high processability. When the motor core according to an aspect of the present disclosure is obtained by stacking the electromagnetic steel sheets according to the present aspect on top of each other, as described below, a coat containing low-melting glass is appropriately molten or softened by pressure annealing, and sheets are joined to each other. In such a case, the coat containing low-melting glass molten or softened is deformed, thickness is reduced, and a maximal diameter of the outermost surface is increased. By providing coats each containing low-melting glass to form a lattice-like pattern at intervals from each other, a space in which a coat containing low-melting glass molten or softened is deformed can be maintained. When the motor core according to an aspect of the present disclosure is obtained by stacking the electromagnetic steel sheets according to the present embodiment on top of each other, accordingly, thickness of the coat containing low-melting glass can be reduced to a significant extent, compared with a coat containing low-melting glass according to a conventional technique. The motor core according to an aspect of the present disclosure obtained by stacking the electromagnetic steel sheets according to the present embodiment on top of each other can thus exhibit a high space factor.

<2. Method for Producing Electromagnetic Steel Sheet>

Another aspect of the present disclosure concerns a method for producing the electromagnetic steel sheet according to an aspect of the present disclosure. The method according to the present aspect comprises a step of forming an organic coat and a step of forming a low-melting glass coat.

[2-1. Step of Forming Organic Coat]

The method according to the present aspect comprises a step of forming an organic coat comprising forming a coat containing an organic material on at least one surface of an electromagnetic steel sheet material.

Electromagnetic steel sheet materials, organic materials, and, optionally, inorganic materials used in this step are appropriately selected from among materials with features described above.

In this step, a coat containing an organic material is provided on at least one surface of an electromagnetic steel sheet material. When the electromagnetic steel sheet according to an aspect of the present disclosure obtained by the method according to the present aspect comprises a coat containing an organic material only on one surface of an electromagnetic steel sheet material, for example, a coat containing an organic material may be provided only on one surface of the electromagnetic steel sheet material in this step. When the electromagnetic steel sheet according to an aspect of the present disclosure obtained by the method according to the present aspect comprises a coat containing an organic material provided on both surfaces of an electromagnetic steel sheet material, and a coat containing low-melting glass provided at least partially on the surface of the coat containing an organic material provided on one surface thereof, alternatively, a coat containing an organic material may be provided on both surfaces of the electromagnetic steel sheet material in this step.

In this step, a person skilled in the art can appropriately select a means of forming a coat containing an organic material in accordance with types of an organic material and optionally an inorganic material used. When an organic material used is an aqueous organic resin exemplified above, for example, this step may be carried out by coating an electromagnetic steel sheet material with a coating liquid in the form of an emulsion, dispersion, or suspension containing the organic material and optionally an inorganic material. A means of coating an electromagnetic steel sheet material with a coating liquid containing an organic material and optionally an inorganic material includes, but not particularly limited to, a roll coater, a flow coater, a spray, and a knife coater. By performing this step with the use of such means, a coat containing an organic material can be formed.

[2-2. Step of Forming Low-Melting Glass Coat]

The method according to the present aspect comprises a step of forming a low-melting glass coat comprising forming a coat containing low-melting glass at least partially on one outermost surface of the steel sheet material obtained in the step of forming an organic coat.

Low-melting glass and optionally an organic material used in this step are appropriately selected from among materials with features described above.

In this step, a person skilled in the art can appropriately select a means of forming a coat containing low-melting glass in accordance with a type of low-melting glass used. When low-melting glass is a material of the composition exemplified above, for example, this step may be carried out by coating the electromagnetic steel sheet material with a coating liquid containing low-melting glass powders. When the electromagnetic steel sheet according to an aspect of the present disclosure obtained by the method according to the present aspect further comprises an organic material incorporated into the coat containing low-melting glass, this step may be carried out by coating the electromagnetic steel sheet material with a coating liquid in the form of an emulsion, dispersion, or suspension containing the organic material in addition to low-melting glass powders. A means of coating the electromagnetic steel sheet material with a coating liquid containing low-melting glass powders includes, but not limited to, an inkjet printer and a roll coater. By performing this step with the means described above, a coat containing an organic material can be formed.

[2-3. Step of Baking]

The method according to the present aspect can comprise a step of baking comprising baking the coat containing an organic material and the coat containing low-melting glass formed in the previous step, according to need.

The step of baking may be performed after the step of forming an organic coat and after the step of forming a low-melting glass coat (specifically, the step of baking may be separately performed two times after the step of forming an organic coat and after the step of forming a low-melting glass coat), or the step of baking may be performed only once after the step of forming an organic coat and the step of forming a low-melting glass coat. The embodiment of this step encompasses both cases. From the viewpoint of saving of energy necessary for baking, this step may be performed only once after the step of forming an organic coat and the step of forming a low-melting glass coat. A means of baking includes, but not limited to, a hot-air, infrared radiation, and induction heating baking apparatus. A person skilled in the art can appropriately select the baking temperature within a range of, for example, 150° C. to 400° C., such as 200° C. to 300° C., in accordance with the types of organic materials and low-melting glass materials used. By performing this step under the conditions described above, a coat containing an organic material and a coat containing low-melting glass can be joined to the sheet.

<3. Motor Core>

Another aspect of the present disclosure concerns a motor core comprising the electromagnetic steel sheet according to an aspect of the present disclosure.

The motor core according to the present aspect comprises a plurality of the electromagnetic steel sheets according to an aspect of the present disclosure stacked on top of each other. Concerning the motor core according to the present aspect, a coat containing low-melting glass is used as a joining coat that joins electromagnetic steel sheets adjacent to each other. As described above, low-melting glass contained in the joining coat of the electromagnetic steel sheet according to an aspect of the present disclosure has a melting point or softening point that exceeds the temperature range in which the motor core according to the present aspect is generally used. In addition, such melting point or softening point is below the temperature range in which pressure annealing is performed in the method for producing the motor core according to an aspect of the present disclosure described below. Accordingly, the motor core according to the present aspect can exert good thermostability without causing melting or softening of the joining coat at the time of use.

Concerning the motor core according to the present aspect, coat thickness of the joining coat containing low-melting glass is, for example, 3 μm or less, and it may be 1 μm or less. In contrast, a joining coat containing low-melting glass used in a conventional motor core generally has coat thickness of approximately 10 μm, and a space factor is thus low. Therefore, the motor core according to the present aspect can exhibit a higher space factor than a conventional motor core.

The space factor according to the present aspect can be determined, but not limited to, in accordance with JIS C 2550-5.

<4. Method for Producing Motor Core>

Another aspect of the present disclosure concerns a method for producing the motor core according to an aspect of the present disclosure. The method according to the present aspect comprises a step of punching and a step of pressure annealing.

[4-1. Step of Punching]

The method according to the present aspect comprises a step of punching comprising punching out the electromagnetic steel sheet according to an aspect of the present disclosure.

In this step, a means for punching out the electromagnetic steel sheet according to an aspect of the present disclosure includes, but not limited to, a punch press involving the use of a mold of a given shape. Concerning the electromagnetic steel sheet according to an aspect of the present disclosure, as described above, a surface comprising a coat containing an organic material is used as a surface subjected to processing such as punching. In this step, accordingly, an area in which a coat containing hard low-melting glass is brought into direct contact with a mold used for punching can be reduced. With the use of the electromagnetic steel sheet according to an aspect of the present disclosure, accordingly, this step can be performed with high punching processability.

In the present disclosure, punching processability of the electromagnetic steel sheet can be evaluated, but not limited to, by repeatedly press-punching the electromagnetic steel sheet under the same conditions, and counting the number of the punching repeated until the level of wear of the punched surface reaches a given level.

[4-2. Step of Pressure Annealing]

The method according to the present aspect comprises a step of pressure annealing comprising stacking a plurality of the electromagnetic steel sheets obtained in the step of punching on top of each other, and subjecting the resultant to annealing with pressurization.

In this step, pressure annealing is performed to relieve stress imposed on the electromagnetic steel sheet in the step of punching. A means of subjecting the electromagnetic steel sheet to pressure annealing includes, but not limited to, a means that is generally used in the art, such as an annealing furnace. In this case, a given weight may be applied on the top surface of the stacked electromagnetic steel sheets and the resultant may then be subjected to annealing with pressurization in that state. In some embodiments, pressure annealing may be carried out at a temperature of 700° C. to 900° C. In another embodiment, it may be carried out at a temperature of 700° C. to 800° C. Pressure annealing may be carried out for a period of 1 hour or longer.

In this step, a coat containing low-melting glass provided at least partially on the outermost surface of the stacked electromagnetic steel sheets is molten or softened as a result of pressure annealing, and the stacked sheets are joined to each other. In this case, a coat containing low-melting glass molten or softened is deformed, thickness thereof is reduced, and a maximal diameter of the outermost surface thereof is increased. As a result, an increased area of the outermost surface of the coat containing low-melting glass may be 50% or more of the surface area of the electromagnetic steel sheet on which the coat is provided, or it may be 75% or more thereof. By performing this step, an increased area of the outermost surface of the coat containing low-melting glass is adjusted within the range described above. Thus, joining property of the electromagnetic steel sheet of the motor core can be improved. In addition, the thus obtained motor core can exhibit a high space factor as a consequence.

In each embodiment of the present disclosure, the term "maximal diameter of the outermost surface of a coat containing low-melting glass" refers to a maximal length of the outermost surface of the coat containing low-melting glass (i.e., the uppermost surface of the coat). When the outermost surface of the coat is circular, for example, the maximal diameter of the outermost surface is a diameter of the circle. When the outermost surface of the coat is polygonal, for example, the maximal diameter of the outermost surface is a maximal length of the diagonal line.

In an embodiment, this step may be performed under the conditions that satisfy formula (I):

$$Xa = \sqrt{\frac{X^2 \times t}{ta}} \geqq Y \cong L \times 0.5. \quad \text{(I)}$$

In another embodiment, this step may be performed under the conditions that satisfy formula (II):

$$Y \geqq Xa \geqq 0.8Y \cong \sqrt{\frac{2Y^2}{\pi}}. \quad \text{(II)}$$

In formulae (I) and (II),

X represents a maximal diameter of the outermost surface of the coat containing low-melting glass before the step of pressure annealing;

t represents thickness of the coat containing low-melting glass before the step of pressure annealing;

Xa represents a maximal diameter of the outermost surface of the coat containing low-melting glass after the step of pressure annealing;

ta represents thickness of the coat containing low-melting glass after the step of pressure annealing;

Y represents a distance between centroids of the outermost surfaces of the coats containing low-melting glass adjacent thereto; and L represents a teeth width of a stator to which the motor core according to an aspect of the present disclosure is applied.

In formulae (I) and (II), X, Xa, Y, and L are defined by the same unit (e.g., mm). In formula (I), t and ta are defined by the same unit (e.g., μm).

In formula (I), L is generally within the range of 6 mm to 8 mm.

In formulae (I) and (II), Y may be 3 mm to 4 mm, and Y may be approximately 3 mm.

Figure 2:
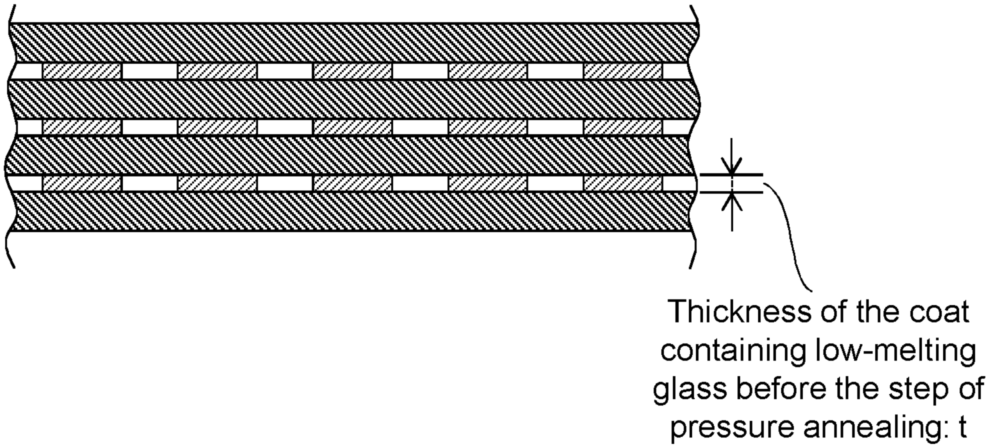
FIG. 2 shows a cross-sectional view that schematically shows a change in a coat containing low-melting glass in the step of pressure annealing of the method for producing a motor core according to an aspect of the present disclosure: (A) shows a cross-sectional view of the stacked electromagnetic steel sheets before the step of pressure annealing; and (B) shows a cross-sectional view of the stacked electromagnetic steel sheets (the motor core) after the step of pressure annealing.
Figure 2:
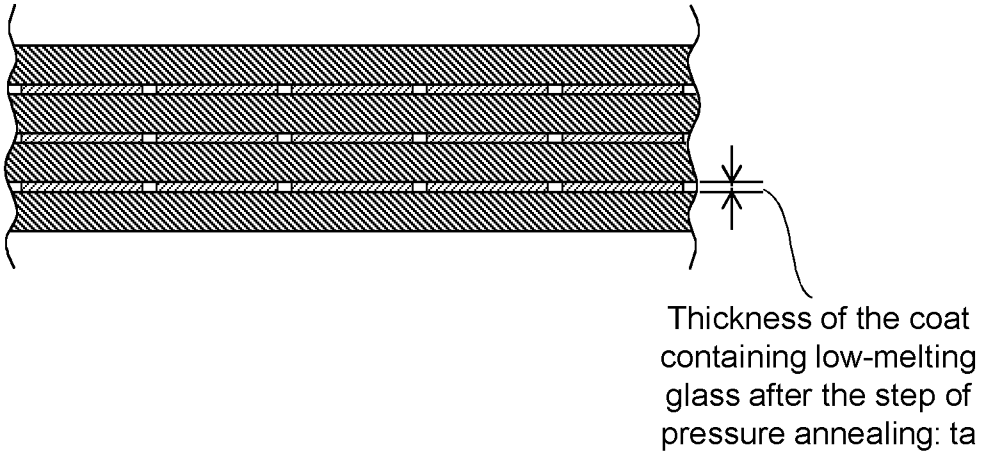
Figure 3:
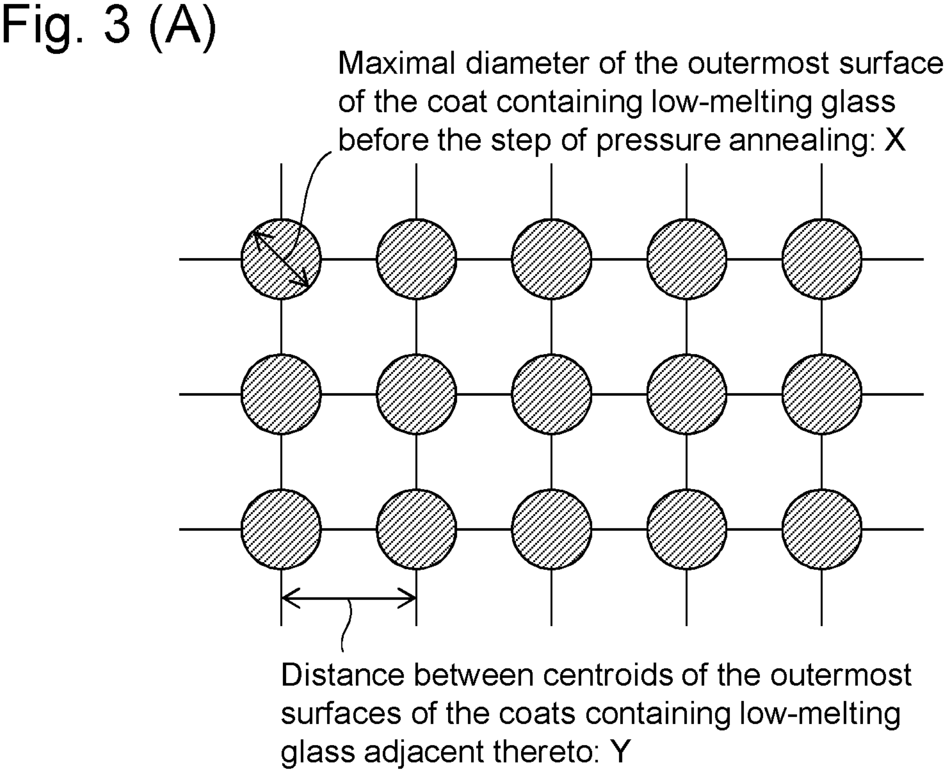
FIG. 3 shows a top view that schematically shows a change in a coat containing low-melting glass in the step of pressure annealing of the method for producing a motor core according to an aspect of the present disclosure: (A) shows a top view of the stacked electromagnetic steel sheets before the step of pressure annealing; and (B) shows a top view of the stacked electromagnetic steel sheets (the motor core) after the step of pressure annealing.
Figure 3:
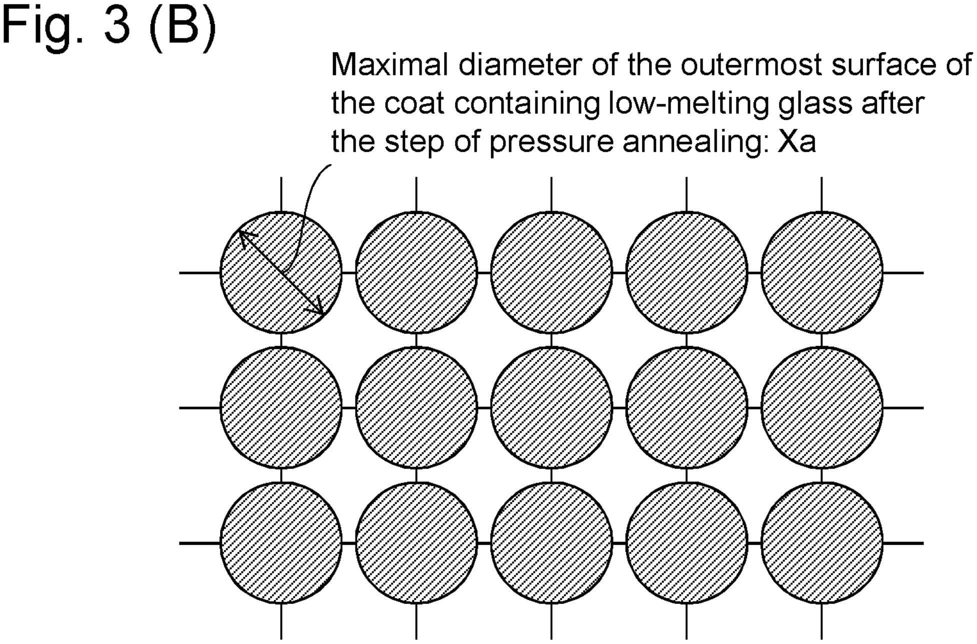

FIG. 2 shows a cross-sectional view that schematically shows a change in a coat containing low-melting glass in this step, and FIG. 3 shows a top view that schematically shows a change in a coat containing low-melting glass in this step. As shown in FIGS. 2(A) and 2(B), a coat containing low-melting glass provided at least partially on the outermost surface of the stacked electromagnetic steel sheets is deformed as a result of pressure annealing, and thickness "t" is reduced to "ta." As shown in FIGS. 3(A) and 3(B), in such a case, the maximal diameter "X" of the outermost surface of the coat containing low-melting glass is increased to "Xa." When the maximal diameter "Xa" of the outermost surface of the coat containing low-melting glass after the step of pressure annealing is equal to or less than the distance "Y" between centroids of the outermost surfaces of the adjacent coats containing low-melting glass, as defined in Formulae (I) and (II), a space in which the coat containing low-melting glass is deformed can be ensured. When the distance "Y" between centroids of the outermost surfaces of the adjacent coats containing low-melting glass is approximately 0.5 times the teeth width of a stator to which the motor core according to an aspect of the present disclosure is applied, as defined in Formula (I), the coat can be joined to the entire stator including the teeth portion. By performing this step under the conditions that satisfy Formulae (I) and (II), accordingly, joining property of the electromagnetic steel sheets of the resulting motor core can be enhanced. In addition, the resulting motor core can exhibit a high space factor.

EXAMPLES

Hereafter, the present disclosure is described in greater detail with reference to the examples, although the technical scope of the present disclosure is not limited to these examples.

I: Production of Electromagnetic Steel Sheet

I-1: Example 1

An electromagnetic steel sheet (thickness: 0.25 mm) without a coat was prepared. The electromagnetic steel sheet was coated with a coating liquid containing an organic material (epoxy resin) and an inorganic material ($SiO_2$) using a roll coater on both surfaces. Subsequently, a coating liquid in the form of an emulsion containing low-melting glass powders ($SiO_2$—$B_2O_3$—$R_2O$, wherein R represents an alkali metal; melting point: about 500° C. to 600° C.; particle diameter: 10 μm) and an organic material (acrylic resin) at 3:1 by weight was applied to one surface of the electromagnetic steel sheet using an inkjet printer, so that dots each with a diameter of 1 mm were provided to form a lattice-like pattern (3 mm×3 mm). The coated electromagnetic steel sheet was subjected to baking at 750° C. to obtain an electromagnetic steel sheet with a given coat.

I-2: Comparative Example 1

An electromagnetic steel sheet provided with a coat containing an organic material and low-melting glass on both surfaces thereof was obtained in the same manner as in Example 1, except that a coating liquid containing low-melting glass was not applied.

I-3: Comparative Example 2

An electromagnetic steel sheet provided with a coat containing low-melting glass ($SiO_2$—$B_2O_3$—$R_2O$, wherein R represents an alkali metal) on approximately entire areas of the both surfaces was obtained in the manner described in a known literature (JP 2016-176138 A).

I-4: Comparison of Press Punching Processability

Figure 4:
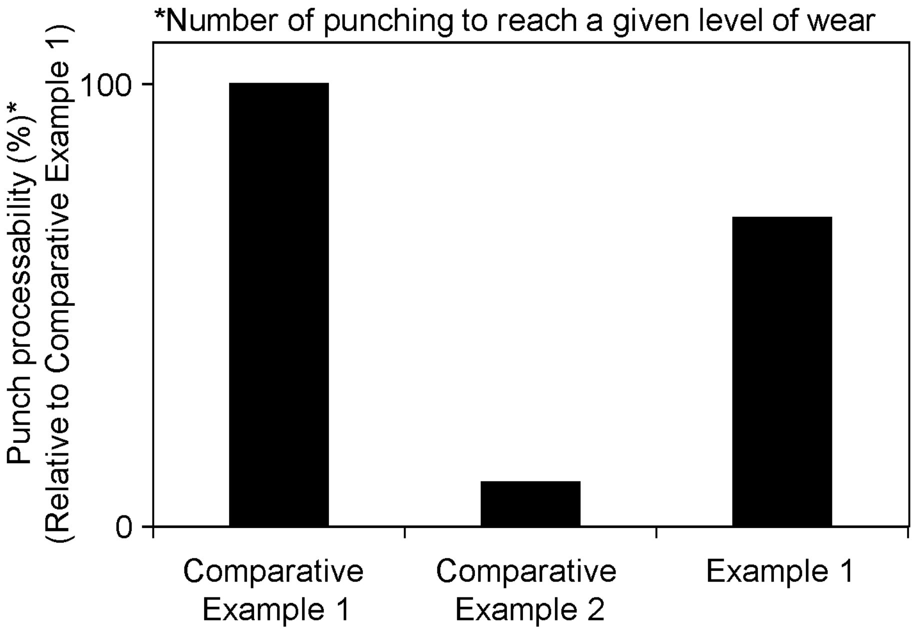
FIG. 4 shows a graph that shows a comparison of press punching processability of the electromagnetic steel sheets of Example 1, Comparative Example 1, and Comparative Example 2.

Press punching processabilities of the electromagnetic steel sheets of Example 1, Comparative Example 1, and Comparative Example 2 were compared. Each of the electromagnetic steel sheets was repeatedly press-punched under the same conditions, and the number of punching until the level of wear of the punched surface reached a given level was counted. Concerning the electromagnetic steel sheet of Example 1, a surface provided with a coat containing an organic material was used as a surface subjected to press punching. FIG. 4 shows a graph demonstrating a comparison of press punching processability of the electromagnetic steel sheets of Example 1, Comparative Example 1, and Comparative Example 2. In the figure, press punching processability shown along the vertical axis is a relative value based on the number of the electromagnetic steel sheet according to Comparative Example 1, which is designated as 100%.

As shown in FIG. 4, the electromagnetic steel sheet of Comparative Example 2 is provided with hard coats containing low-melting glass on approximately entire areas of the both surfaces. Accordingly, durability thereof against annealing was enhanced, although press punching processability was deteriorated to a significant extent. In contrast, the electromagnetic steel sheet of Example 1 exhibited significantly higher press punching processability than the electromagnetic steel sheet of Comparative Example 2. The electromagnetic steel sheet of Example 1 comprises a coat containing an organic material provided on the press-punched surface, and a hard coat containing low-melting glass provided to form a lattice-like pattern on the back surface of the press-punched surface. By providing the coats in such a manner, the electromagnetic steel sheet of Example 1 is deduced to have a reduced area of contact between the punched surface and the hard coat containing low-melting glass, and improved punching processability, compared with the electromagnetic steel sheet of Comparative Example 2.

II: Production of Motor Core and Comparison of Space Factor

The electromagnetic steel sheets prepared in Example 1, Comparative Example 1, and Comparative Example 2 in the manner described in I above were punched out and formed into sheets with a size of 30 mm×320 mm, and 20 sheets thereof were stacked on top of each other. The stacked electromagnetic steel sheets of Example 1, Comparative Example 1, and Comparative Example 2 were mounted on positioning jigs. Weights were applied on the upper surfaces of the stacked electromagnetic steel sheets of Example 1, Comparative Example 1, and Comparative Example 2, the resultants were introduced into the furnace, and annealing was carried out with pressurization at 750° C. to obtain motor cores. The motor cores produced from the electromagnetic steel sheets of Comparative Examples 1 and 2 were designated as the motor cores of Example 1, Comparative Example 1, and Comparative Example 2, respectively. When producing the motor core of Example 1, the pressurization conditions were adjusted to perform pressure annealing under the conditions that would satisfy formula (I) below:

$$Xa = \sqrt{\frac{X^2 \times t}{ta}} \leqq Y \cong L \times 0.5 \tag{I}$$

wherein

Figure 5:
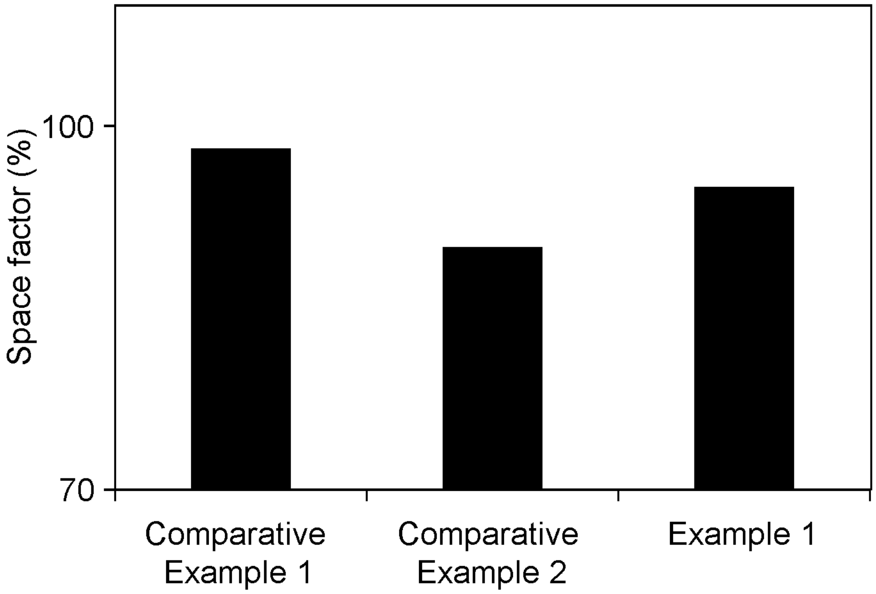
FIG. 5 shows a graph that shows a comparison of space factors of the motor cores of Example 1, Comparative Example 1, and Comparative Example 2.

X represents a maximal diameter (mm) of the outermost surface of the coat containing low-melting glass before the step of pressure annealing;

t represents thickness (μm) of the coat containing low-melting glass before the step of pressure annealing;

Xa represents a maximal diameter (mm) of the outermost surface of the coat containing low-melting glass after the step of pressure annealing;

ta represents thickness (μm) of the coat containing low-melting glass after the step of pressure annealing;

Y represents a distance (mm) between centroids of the outermost surfaces of the coats containing low-melting glass adjacent thereto; and L represents a teeth width (mm) of a stator to which the motor core is applied (FIGS. 2 and 3). Specifically, the weight to be applied was adjusted to bring the thickness "ta" of the coat containing low-melting glass to 3 μm or less after pressure annealing. The motor cores of Comparative Examples 1 and 2 were produced under the same conditions as with Example 1. Concerning the motor cores of Example 1, Comparative Example 1, and Comparative Example 2, space factors were calculated in accordance with a procedure for measuring thickness of the stacked sheets with pressurization at 1 MPa. FIG. 5 shows a graph that shows a comparison of space factors of the motor cores of Example 1, Comparative Example 1, and Comparative Example 2. In the figure, the vertical axis shows relative values based on the space factor in a bulky state without gaps between the coats and the stacked sheets, which is designated 100%.

In the case of the motor core of Comparative Example 2, as shown in FIG. 5, the space factor was lower than that of the motor core of Comparative Example 1. In the case of the motor core of Example 1, in contrast, the space factor was substantially equal to that of the motor core of Comparative Example 1. In the case of the motor core of Comparative Example 2, thickness of the joining coat containing low-melting glass was approximately 10 μm. In the case of the motor core of Comparative Example 1, in contrast, thickness of the coat containing an organic material and low-melting glass was approximately 1 μm or less. The motor core of Comparative Example 2 is deduced to exhibit a low space factor because of a very thick joining coat. In the case of the motor core of Example 1, in contrast, a joining coat containing low-melting glass is provided only on one surface to form a lattice-like pattern. By providing the coat in such a manner, lowering in a space factor of the motor core of Example 1 is deduced to be suppressed, and the motor core of Example 1 is deduced to exhibit a space factor equivalent to that of the motor core of Comparative Example 1.

DESCRIPTION OF SYMBOLS

1: Electromagnetic steel sheet material
2: Coat containing organic material
3: Coat containing low-melting glass
100: Electromagnetic steel sheet

What is claimed is:

1. An electromagnetic steel sheet, comprising:

a first coat containing an organic material provided on one outermost surface of the electromagnetic steel sheet, a second coat containing the organic material on the other outermost surface of the electromagnetic steel sheet, and coats containing a low-melting glass having a melting point of 500° C. and 600° C. provided at least partially on a surface of the second coat.

2. The electromagnetic steel sheet according to claim 1, wherein the coats containing the low-melting glass are provided to form lattice pattern, such that portions of the surface of the second coat are not covered by the low-melting glass.

3. The electromagnetic steel sheet according to claim 2, wherein the coats containing the low-melting glass are provided at intervals from each other.

4. A motor core comprising the electromagnetic steel sheet according to claim 1.

5. A method for producing the electromagnetic steel sheet according to claim 1 comprising:

forming the first coat containing the organic material on the one outermost surface of the electromagnetic steel sheet;

forming the second coat containing the organic material on the other outermost surface of the electromagnetic sheet; and forming coats containing the low-melting glass having the melting point of 500° C. to 600° C. at least partially on at least partially on the surface of the second coat.

6. A method for producing the motor core according to claim 4 comprising:

a step of punching comprising punching out the electromagnetic steel sheet according to claim 1; and a step of pressure annealing comprising stacking a plurality of the electromagnetic steel sheets obtained in the step of punching on top each other and subjecting the resultant to annealing with pressurization.

7. The method according to claim 6, wherein the step of pressure annealing is performed under the conditions that satisfy formula (I):

$$Xa = \sqrt{\frac{X^2 \times t}{ta}} \leqq Y \cong L \times 0.5 \tag{I}$$

wherein

X represents a maximal diameter of the outermost surface of the coats containing low-melting glass before the step of pressure annealing;

t represents thickness of the coats containing low-melting glass before the step of pressure annealing;

Xa represents a maximal diameter of the outermost surface of the coats containing low-melting glass after the step of pressure annealing;

ta represents thickness of the coats containing low-melting glass after the step of pressure annealing;

Y represents a distance between centroids of the outermost surfaces of the coats containing low-melting glass adjacent thereto; and L represents a teeth width of a stator to which the motor core is applied.

8. An electromagnetic steel sheet, comprising:

a coat containing an organic material provided on one outermost surface of the electromagnetic steel sheet, and coats containing a low-melting glass having a melting point of 500° C. to 600° C. provided at least partially on the other outermost surface of the electromagnetic steel sheet, wherein the coats containing the low-melting glass do not contain the organic material.

9. The electromagnetic steel sheet according to claim 8, wherein the coats containing the low-melting glass are provided to form a lattice pattern.

10. The electromagnetic steel sheet according to claim 9, wherein the coats containing the low-melting glass are provided at intervals from each other.

11. A motor core comprising the electromagnetic steel sheet according to claim 8.

12. A method for producing the electromagnetic steel sheet according to claim 8 comprising:

forming the coat containing the organic material on the one outermost surface of the electromagnetic steel sheet; and forming coats containing the low-melting glass having the melting point of 500° C. to 600° C. at least partially on the other outermost surface of the steel sheet material, wherein the coats containing the low-melting glass do not contain the organic material.

13. A method for producing the motor core according to claim 11 comprising:

a step of punching comprising punching out the electromagnetic steel sheet according to claim 8; and a step of pressure annealing comprising stacking a plurality of the electromagnetic steel sheets obtained in the step of punching on top each other and subjecting the resultant to annealing with pressurization.

14. The method according to claim 13, wherein the step of pressure annealing is performed under the conditions that satisfy formula (I):

$$Xa = \sqrt{\frac{X^2 \times t}{ta}} \leqq Y \cong L \times 0.5 \tag{I}$$

wherein

X represents a maximal diameter of the outermost surface of the coats containing low-melting glass before the step of pressure annealing;

t represents thickness of the coats containing low-melting glass before the step of pressure annealing;

Xa represents a maximal diameter of the outermost surface of the coats containing low-melting glass after the step of pressure annealing;

ta represents thickness of the coats containing low-melting glass after the step of pressure annealing;

Y represents a distance between centroids of the outermost surfaces of the coats containing low-melting glass adjacent thereto; and L represents a teeth width of a stator to which the motor core is applied.

15. The electromagnetic steel sheet according to claim 1, wherein a coat of the low-melting glass is not provided on the first coat containing the organic material.

16. The electromagnetic steel sheet according to claim 8, wherein a coat of the low-melting glass is not provided on the coat containing the organic material that is provided on the one outermost surface of the electromagnetic steel sheet.

* * * * *